(No Model.)
E. M. PEACOCK.
ATTACHING HANDLES TO VESSELS.
No. 503,673. Patented Aug. 22, 1893.
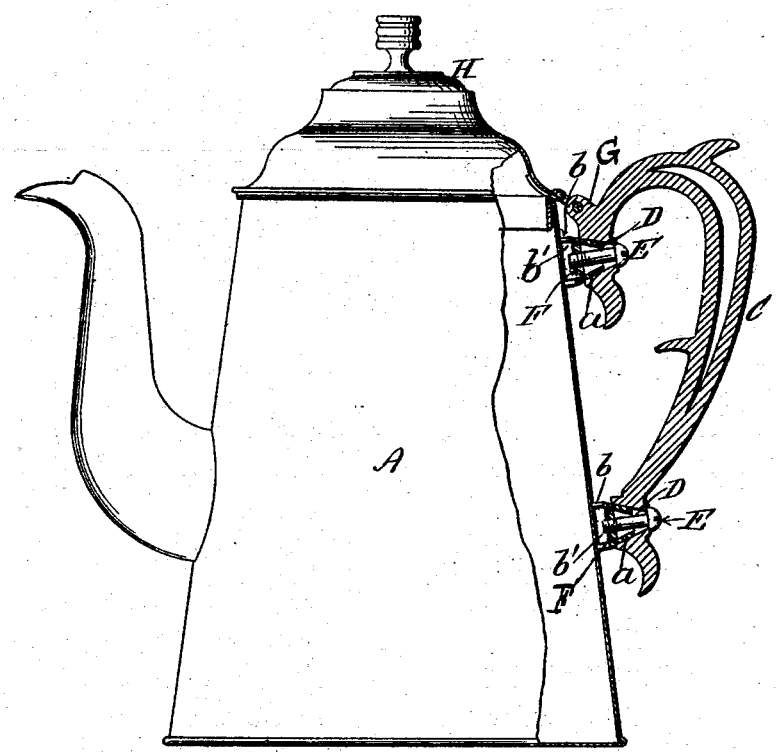
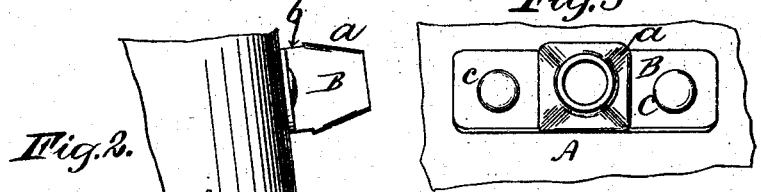
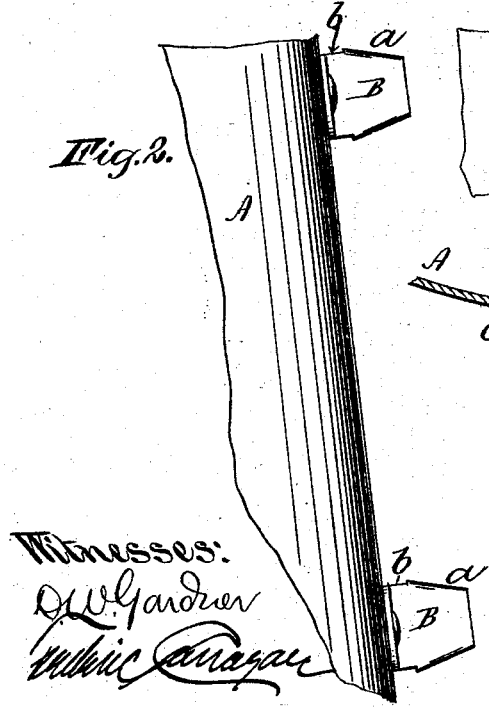
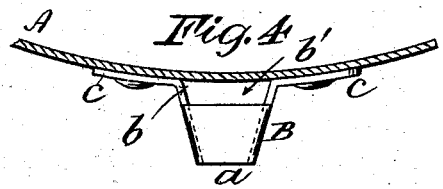
Witnesses:
O. W. Gardner
Frederic Carnagan
Inventor:
Edward M. Peacock
By— Ernest C. Webb
Atty

UNITED STATES PATENT OFFICE.

EDWARD M. PEACOCK, OF BROOKLYN, NEW YORK.

ATTACHING HANDLES TO VESSELS.

SPECIFICATION forming part of Letters Patent No. 503,673, dated August 22, 1893.

Application filed December 7, 1891. Renewed January 23, 1893. Serial No. 459,448. (No model.)

*To all whom it may concern:*

Be it known that I, EDWARD M. PEACOCK, a citizen of the United States, and a resident of Brooklyn, in the county of Kings and State of New York, have invented certain new and useful Improvements in Attaching Handles to Vessels, of which the following is a specification.

My invention relates to improvements in attaching handles to coffee, tea pots, and similar vessels, and is particularly adapted to that class known as enameled ware, having for its object the attachment of such handles subsequent to the enameling operation, and without injury to the enameled surface.

To this end my invention consists in the details of construction and the combinations of parts, all as hereinafter more particularly pointed out and claimed.

In the drawings I have shown my invention as applied to a tea pot.

Figure 1, is a side elevation of a coffee pot, partly in section, provided with my improvement. Fig. 2, is a side view of the handle projections attached to a fragment of a vessel. Fig. 3, is a front view; and, Fig. 4, is a top view of the same.

Like parts in all the figures are similarly designated.

A, represents the vessel provided at its rear with the projections B to which the handle is attached. These projections I prefer to stamp and roll out of a single piece of light sheet metal, and, as shown, they consist of an outer portion $a$, in the shape of a frustum of a cone, and an inner portion $b$, channeled or cut away above and below and provided with the flanges or wings $c$, through which the said projections are riveted to the vessel body prior to the enameling operation, and are coated with the same enamel applied to the vessel body. The handle C, is provided with the cone-shaped hollow bosses D, adapted to fit and wedge over the cone-shaped projections on the vessel body, in which position the handle is secured by the screws E, passing through the bosses of the handle and through the cone-shaped projections B, and engaging with the nuts F, which, as the screws are tightened, are drawn up into the cones $a$, and firmly wedged therein, tightly and rigidly securing the handle to the vessel. If desired, the nuts may be slightly beveled to wedge more securely in the cones $a$. By reason of the cone construction of the projections, and the corresponding hollow bosses of the handle, a neat and attractively finished article is attained, and without any damage or injury to the enamel coating. It will be observed that the channel at $b'$ forms an air space between the boss and the vessel body which will tend to prevent the handle being heated when the vessel is in use. And through this channel also the securing nut is introduced. To the upper part of the handle C, I cast a projection G, to which the lid or cover H, may be hinged in any ordinary manner.

What I claim as new, and desire to secure by Letters Patent, is—

A vessel provided with handle securing projections comprising an outer cone-shaped portion, an inner portion cut away or channeled, and flanged portions through which it is secured to the vessel body, in combination with a handle having hollow bosses adapted to engage with said projections and screws passing through the bosses and projections and engaging with nuts which wedge in the cones of the projections, substantially as described.

Signed at New York, in the county of New York and State of New York, this 24th day of October, A. D. 1891.

EDWARD M. PEACOCK.

Witnesses:
 ERNEST C. WEBB,
 EUGENE V. MYERS.